Figure 3:
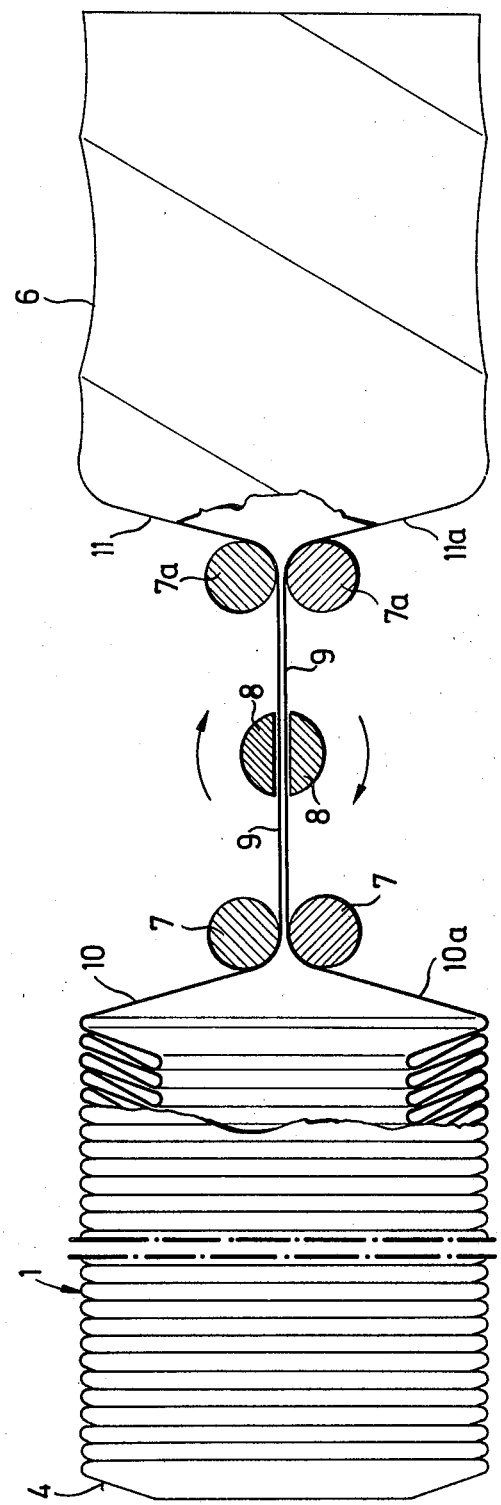

United States Patent [19]

Stemmler

[11] 3,942,568

[45] Mar. 9, 1976

[54] UNILATERALLY CLOSED HOLLOW STICK OF SHIRRED SAUSAGE CASING WITH AN INNER CLOSURE FORMED FROM THE TUBULAR CASING ITSELF

[75] Inventor: Hans Stemmler, Wiesbaden-Schierstein, Germany

[73] Assignee: Hoechst Aktiengesellschaft, Frankfurt, Germany

[22] Filed: Dec. 2, 1974

[21] Appl. No.: 528,837

[30] Foreign Application Priority Data

Dec. 5, 1973 Germany............................ 2360481

[52] U.S. Cl. ...................... 150/1; 17/49; 206/802; 229/53; 426/138
[51] Int. Cl.[2].................. B65D 29/00; A22C 13/02
[58] Field of Search ........ 150/3, 1; 229/53; 426/138, 426/140; 206/802; 17/49

[56] References Cited

UNITED STATES PATENTS

| | | | |
|---|---|---|---|
| 3,274,005 | 9/1966 | Alsys.................................. | 426/140 |
| 3,383,222 | 5/1968 | Alsys et al. ........................ | 150/1 |
| 3,865,954 | 2/1975 | Tums et al. ........................ | 426/140 |
| 3,892,869 | 7/1975 | Sheridan et al..................... | 426/138 |

*Primary Examiner*—Leonard Summer
*Attorney, Agent, or Firm*—James E. Bryan

[57] ABSTRACT

This invention relates to a one-piece, self-supporting stick of shirred tubular casing having an end closure within its bore and formed from the tubular casing itself, said end closure being composed of an angular tube roll of unshirred tubular casing. The invention also relates to a process for the production of the closure.

3 Claims, 8 Drawing Figures

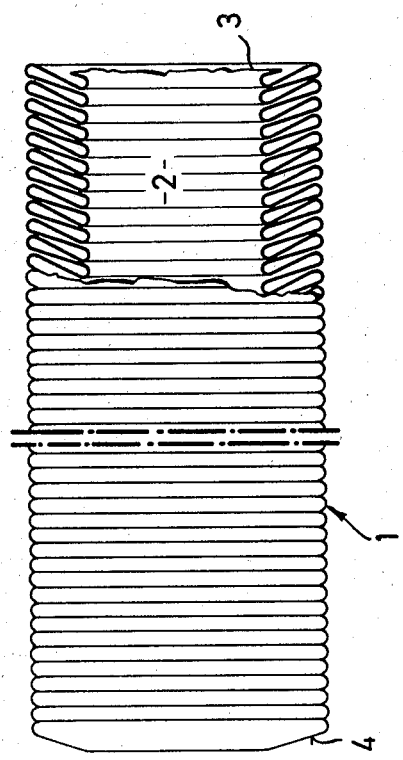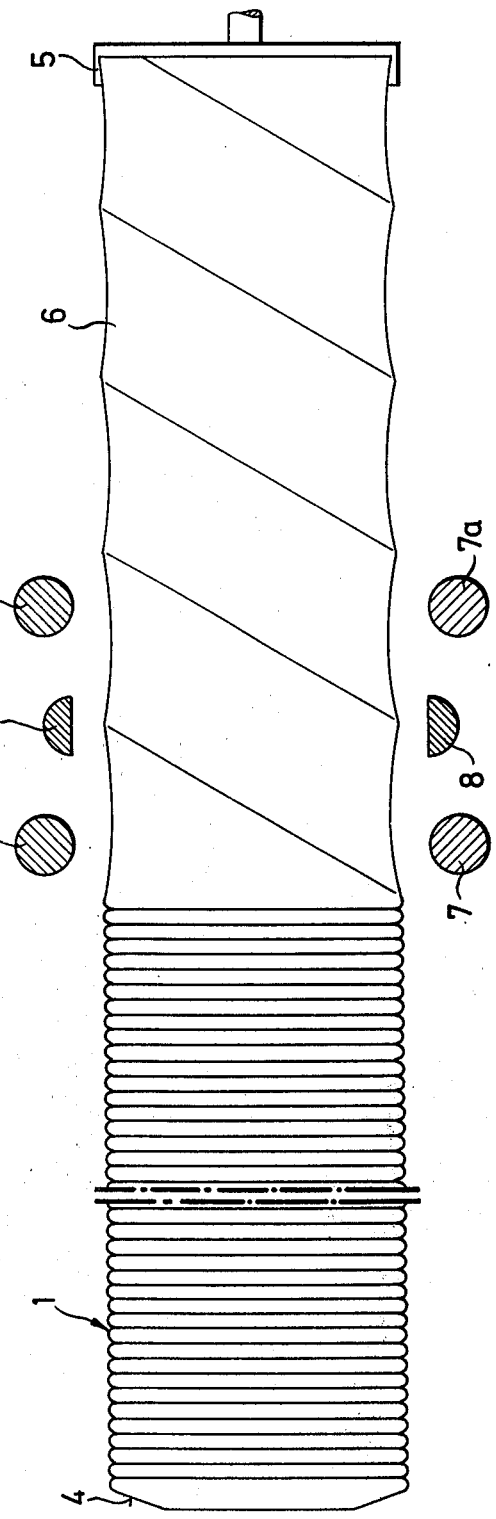

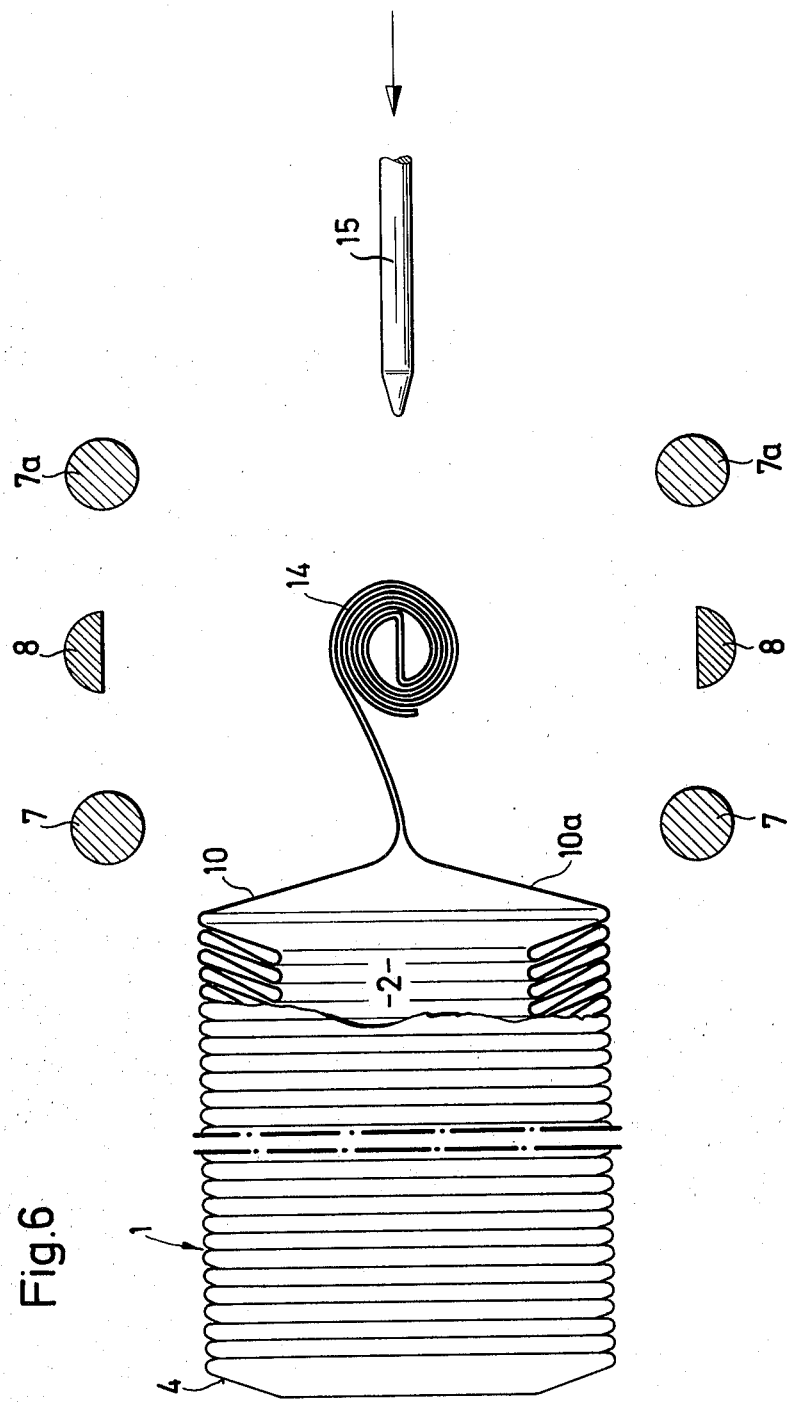

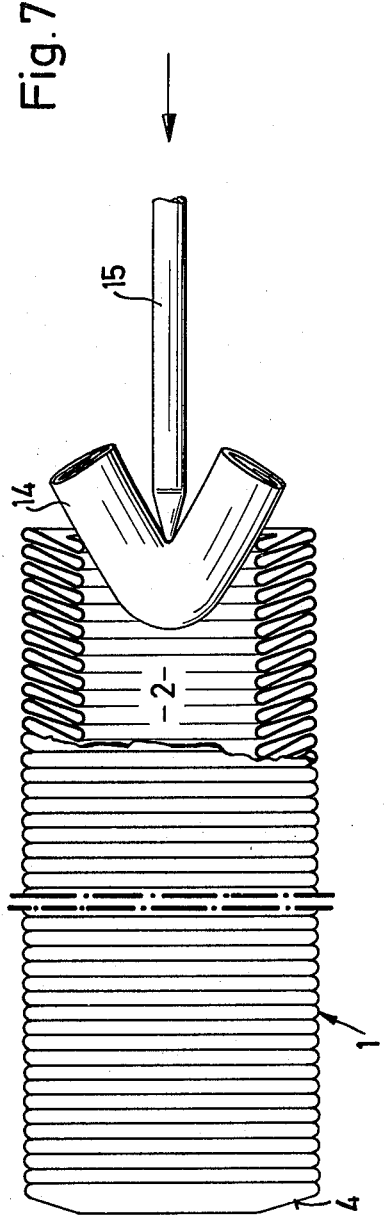
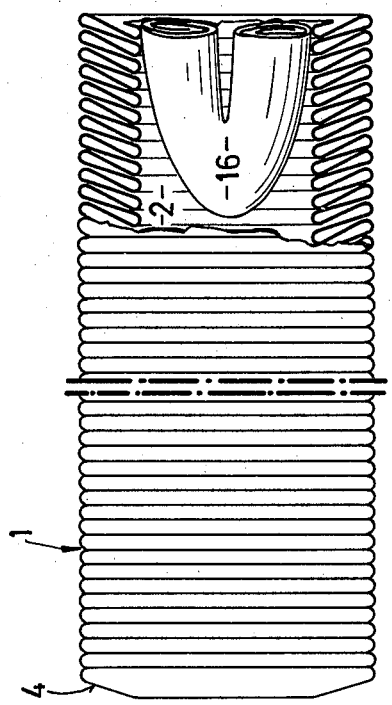

UNILATERALLY CLOSED HOLLOW STICK OF SHIRRED SAUSAGE CASING WITH AN INNER CLOSURE FORMED FROM THE TUBULAR CASING ITSELF

This invention relates to a unilaterally closed cylindrical hollow stick of shirred sausage casing with an end closure arranged within the stick bore and formed from the casing end itself, and to a process for the production thereof.

For the production of sausages, tubular sausage casings of synthetic material, particularly of cellulose hydrate, are used on a large scale. In the production of sausages, such tubular casings are used as shirred hollow sticks. There is used, for example, a tubular casing of a length of about 30 m which is shirred and compressed in the longitudinal direction according to known processes to form a pleated cylindrical hollow stick of a length of about 30 cm.

In using the stick, the stuffing pipe of a sausage filling machine is pushed into the cylindrical bore thereof and the sausage meat is then continuously pressed from the stuffing pipe into the stick. For this purpose, the stick must be closed at the end adjacent to the opening of the stuffing pipe.

By the amount of pressure applied to the sausage meat, the stick is continuously unshirred according to the quantity of sausage meat pressed into it. The sausage strand obtained thereby is divided into a plurality of individual sausages by tying or twisting in synchronism with the filling procedure.

The first obtained sausage of the formed sausage chain is not used since it usually does not contain the desired quantity of stuffing. The quantity contained in this sausage is recovered for reasons of economics. The end closure of the stick, therefore, must be so formed that it easily can be smoothed out by hand since the recovery of the sausage meat contained in the first sausage takes place during the production of the sausage chain. On the other hand, the end closure of the stick must be sufficiently firm so that it is not opened unintentionally by the pressure of the sausage meat acting upon it when the meat is pressed into the stick.

A stick of shirred tubular casing with an end closure within its bore is known, which closure is formed from the tubular casing itself and in the production thereof, by means of a suitable die element, an end portion of the pleated stick is pushed from one side radially into the stick bore and the pleated end portion is simultaneously partially inverted into the stick bore. The end closure of the stick formed thereby has a free passage. The stick produced according to the known process has the disadvantage that its closure is not sufficiently tight when the stick is filled with sausage meat in conventional sausage filling machines, particularly in the case of sticks of relatively large tube bore diameters and especially when sausage meat of a low consistency is used.

Another disadvantage of the known end closure of the stick is that the length of tube material necessary for the formation thereof depends upon whether a wide part of a stick end portion is grasped during the pushing-in procedure.

Since a high stick shirring density is desirable in practice (length of the unshirred tubular casing to the length of the stick formed therefrom) a relatively large quantity of tube material is necessary for forming the known end closure. This entails the additional disadvantage that the sausage meat of the first sausage not completely formed during the filling procedure must be smoothed out along too long a path of tubular casing. Such a measure is not permitted, however, by the high operating speed of modern sausage filling machines so that the sausage meat of the first sausage cannot be recovered for reuse for time reasons.

There is also known a stick with an inner end closure which, in the production thereof, a stick is partially unshirred at its end and the unshirred tube portion is pushed into the stick bore and there twisted.

Still another known end closure in the interior of the stick which is formed from the tubular casing itself is obtained when the end portion of a stick is unshirred, the unshirred tube portion is pushed into the stick bore and then compressed by means of suitable tools within the stick bore to form a stopper.

The two last-mentioned stick end closures have the disadvantage that, for their production, tools must be passed along the entire stick length through the stick bore. There is the risk that the relatively sensitive sticks are damaged, particularly sticks of tubular casing of a small bore diameter since such sticks of a length of about 35 to 40 cm have a stick bore of a diameter of only about 10 mm.

The object of the invention thus is to provide an end closure within the bore of a stick from tubular casing forming the stick, which closure on the one hand resists the pressure of the sausage meat during the filling of the stick without being opened and, on the other hand, however, makes it possible that the sausage meat easily can be removed by hand from the casing, and for the production of which a defined relatively small quantity of tubular casing is necessary.

The present invention provides a one-piece, self-supporting stick of shirred tubular casing with an end closure arranged within its bore and formed from the tubular casing itself, the end closure being composed of an angular tube roll of unshirred tubular casing.

The tubular casing from which the stick and the angular tube roll are formed may be a cellulose derivative, particularly cellulose hydrate, or also a synthetic polymer, such as a polyamide.

In a preferred embodiment, the angular tube roll is so arranged within the stick bore that its dome-shaped end points to the stick end. In a particularly preferred embodiment, the angular tube roll is composed of two double tube layers. A one-piece stick with an end closure of tubular casing arranged within its bore means that the stick and the end closure are formed from one and the same tube portion.

A tube roll, also briefly termed roll in the following, means a body obtained by winding up a flattened tube in the direction of its longitudinal axis, the lateral edges of the individual tube layers being in alignment.

An angular tube roll means a shaped body which results when a tube roll is so bent that a V-shaped body is obtained.

Bending of the tube roll takes place about a bending axis corresponding to the transverse axis of symmetry and perpendicular to the longitudinal axis of the stick.

In the process for the production of the stick of the invention with the inner end closure formed from the tubular casing itself, a part of a stick of shirred tubular casing is unshirred to form an unshirred tube portion, the unshirred portion of tubular casing is flattened and wound from its free end in the direction of the longitudinal axis to form a tube roll, the tube roll is then bent in such a manner that a symmetrical body in the form of an angular roll is obtained, the dome-shaped end of which points to the stick, and the angular tube roll is then pushed into the stick bore.

In a specific embodiment of the process, the unshirred tube portion is flattened directly at the stick by means of a suitable tool and then so wound up to form a double roll that, by the winding procedure, the stick is further unshirred and the initially drawn-off unshirred portion of tubular casing is simultaneously wound up, the longitudinal axis of the stick being perpendicular to the longitudinal axis of the roll, and the double roll is then pushed with bending into the stick bore in such a manner that the dome-shaped end of the bent double roll points to the stick end.

The closure of the stick according to the invention is produced in such a manner that first a portion of the stick is drawn off at the stick beginning with unshirring of the tubular casing. The stick beginning is that part of the stick which is first formed during its production by shirring a tubular casing on a mandrel; correspondingly, the stick portion formed last during the stick production is termed the stick end.

Subsequently, the unshirred tube portion is flattened and wound up from its free end in the direction of the longitudinal axis to form a tube roll.

The tube roll is then bent in such a manner that a symmetrical body in the form of an angular roll is obtained, the dome-shaped end of which points to the stick end.

Then, the angular tube roll is pushed into the stick bore.

In a preferred embodiment, the process for the production of the end closure is performed in such a manner that an end portion of the stick is unshirred, the unshirred tube portion in the immediate vicinity of the still shirred stick is flattened by means of a suitable tool, such as tongs, and wound up in such a manner that the stick is simultaneously further unshirred and the initially drawn-off unshirred tube portion is wound up, the longitudinal axis of the stick being perpendicular to the longitudinal axis of the roll. The tube roll obtained by the described winding procedure according to the preferred embodiment of the process is termed a double roll.

The tube is then bent and pushed into the stick bore in such a manner that the dome-shaped end of the bent roll points to the stick end. Bending of the roll and pushing-in of the angular tube roll may be performed by means of a push rod, for example. In a preferred embodiment, pushing-in and bending are performed in one process step by means of the device mentioned above.

Bending of the double roll is performed about a bending axis which corresponds to the transverse axis of symmetry of the same and is perpendicular to the longitudinal axis of the stick.

The roll is so bent that, after the bending procedure, the longitudinal axis of the tube roll is angular, the legs of the shaped body preferably having the same length. The dome-shaped end of the angular tube roll is that zone of the roll which has the bending edge.

The invention will be further illustrated by reference to the accompanying drawings in which FIGS. 1 to 8 show the various steps involved in the formation of the end closure of the invention.

The stick 1 shown in FIG. 1 is obtained in known manner by shirring a tube and has the form of a hollow cylinder. The cylindrical bore of the stick 1 is termed the stick bore 2. The end closure of the stick is formed at the stick beginning 3. The stick end has the numeral 4.

For the production of the end closure according to the invention, the stick to be closed is gently held over its entire length in prismatic clamping jaws (not shown) and radially and axially fixed in position.

In FIG. 2, first at the stick beginning an end portion of the stick 1 is drawn-off by means of a specific gripping device 5 to form an unshirred portion 6 of the tubular casing. Drawing-off preferably is performed in the direction of the longitudinal axis of the stick 1. But drawing may also be performed laterally, e.g., at a right angle to the longitudinal axis of the stick.

Immediately at the transition of the drawn-off unshirred portion 6 of tubular casing of the shirred stick 1, a flattening clamp 7, a forceps-shaped winding clamp 8, and another flattening clamp 7a are arranged one behind the other and are shown in the open condition. Depending upon the process step, the clamps can be opened or closed by a simple mechanism, which also is not shown. In the open condition, the tube is not contacted by the clamps.

In FIG. 3, the flattening clamp 7, the winding clamp 8, and the flattening clamp 7a are closed. The winding clamp 8 is prepared for winding. By the closing of the clamps, the unshirred portion 6 of tubular casing is flattened in the contact zone of the clamps. The clamps grip the flattened tube 9 over its entire width.

The flattened tube 9 integrally connects the shirred stick 1 with the unshirred portion 6 of tubular casing and is composed of the tube halves 10 and 10a and 11 and 11a. Winding is performed between the flattening clamps 7 and 7a by means of the rotatable forceps-shaped winding clamp 8, without the flattening clamps changing their positions during this procedure. The winding direction selected in the figure is symbolically indicated by an arrow. The direction of rotation during winding, however, has no influence on the process and the end closure.

Figure 4:
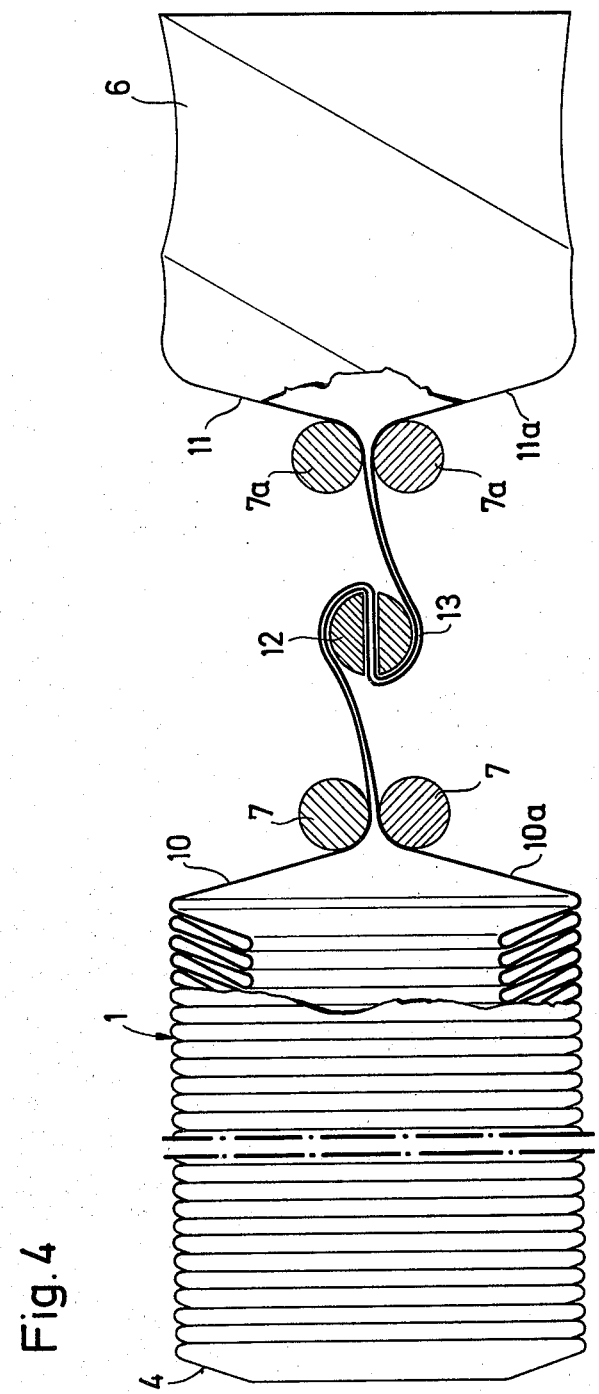
Figure 5:
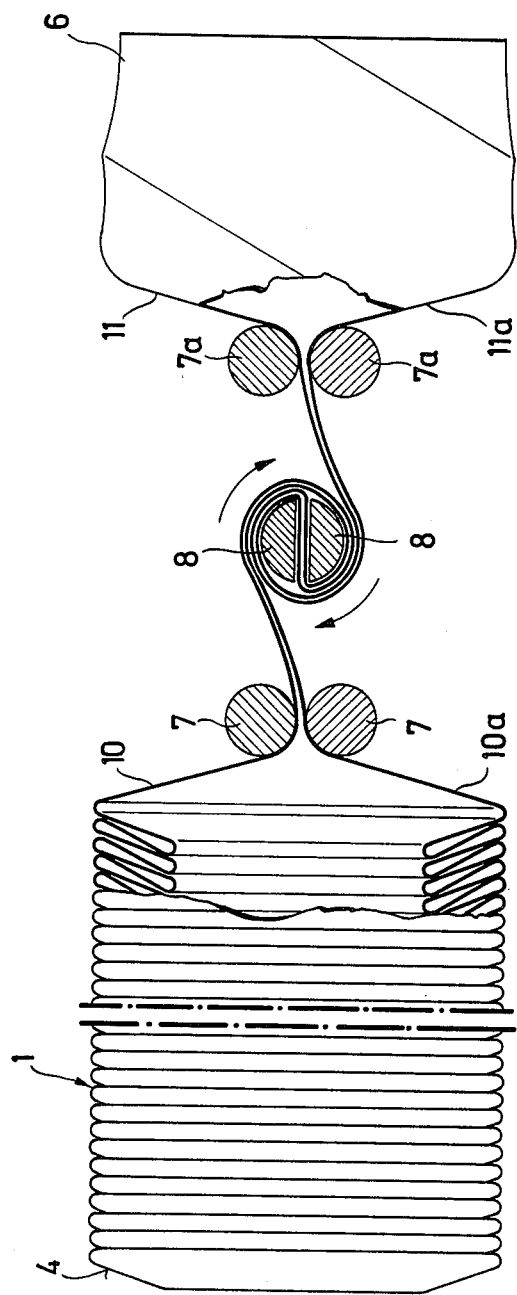

FIGS. 4 and 5 show the winding procedure as seen by the viewer when the forceps-shaped winding clamp 8 is rotated through 180° (FIG. 4) and through 360° (FIG. 5). By the rotation of the winding clamp 8, the tubular casing is drawn-off in the same length from the unshirred tube portion 6 and from the stick towards the winding clamp and wound up. Already after half a rotation of the winding clamp 8, the two tube plies 12 and 13 are wound one upon the other whereby a double tube is obtained. The tube ply 12 is obtained from the two tube halves 10 and 10a, the tube ply 13 from the tube halves 11 and 11a.

In FIG. 6, the finished tube roll 14 is in front of the stick bore 2. The longitudinal axis of the stick is perpendicular to the longitudinal axis of the roll. After the winding clamp 8 has been removed from the finished tube roll 14, the flattening clamps 7 and 7a and the winding clamp 8 are again in the open condition in their initial positions. The push rod 15 acting upon the middle of the roll now pushes the finished tube roll 14 in front of the stick bore 2 into the stick bore 2. The roll is bent thereby in the middle and a tube roll forming symmetrical angles to the longitudinal axis of the stick is obtained.

FIGS. 7 and 8 are rotated through 90° with respect to the other figures and thus represent plan views.

FIG. 7 shows the partially bent tube roll 14 as it is bent to form a V-shaped body when it is pushed in by means of the push rod 15 at the front side of the stick 1, the dome-shaped end being first pushed into the stick bore 2. The dome-shaped end points to the stick end 4.

The V-shaped tube roll arranged in the stick bore and pointing with its dome-shaped end to the stick end is the end closure 16 of the invention which is illustrated in FIG. 8.

In the following, the winding procedure is again briefly described by way of an example.

For this purpose, a stick of a tube diameter of 20 mm and a stick bore of 12 mm is to be provided with an end closure. The tube diameter is the diameter of the tubular casing filled with sausage meat, which substantially corresponds to the outside diameter of the shirred stick.

First, an about 80 mm long portion of tubular casing is drawn from the shirred stick and thereby unshirred. The flattening clamps and the forceps-shaped winding clamp flatten the portion of tubular casing in their contacting zone immediately behind the shirred stick. Then, the tubular casing is wound around the winding clamp by rotating the forceps-shaped winding clamp. The tubular casing is wound in two double layers to form a double roll whereby the one tube ply is supplied via a flattening clamp from the drawn-off portion of tubular casing and the other tube ply via another flattening clamp from the shirred stick. The roll reaches its final diameter when the 80 mm long drawn-off unshirred portion of tubular casing is wound up completely. The result is that, for the tube roll, a total quantity of 160 mm of tubular casing is necessary, 50 percent of the drawn-off portion of tubular casing and 50 percent of shirred stick.

It is further possible to influence the roll construction by changing the percentage distribution of the length of tubular casing necessary for the roll. The maximum of the length of the unshirred portion of tubular casing is 50 percent of the required length of the tubular casing for the production of the tube roll. In the case of very small tube diameters, however, small percentages are also sufficient to achieve an end closure of the invention. This is a measure which particularly finds use in the case of tube or stick diameters of 18 mm and less. Depending upon the bore to be closed, the unshirred portion of tubular casing preferably is in the range between 10 and 50 per cent of the length of tubular casing for the end closure.

The diameter of the tube roll is so selected that it can be pushed as a V-shaped body into the stick bore, on the one hand is sufficiently firmly arranged in the bore and, on the other hand, can easily and without damage be pressed out of the bore. The length of tubular casing required for the end closure of the invention is exactly defined for each diameter and is not determined by the random shirring density of the stick used. By means of the described process it is possible to produce with a minimum of tube material an extremely durable, tight and always reproducible end closure.

It will be obvious to those skilled in the art that many modifications may be made within the scope of the present invention without departing from the spirit thereof, and the invention includes all such modifications.

What is claimed is:

1. A one-piece, self-supporting stick of shirred tubular casing having an end closure within its bore and formed from the tubular casing itself, said end closure being composed of an angular tube roll of unshirred tubular casing.

2. A stick according to claim 1 in which the end closure is formed by an angular double roll.

3. A stick according to claim 1 in which the angular tube roll is so positioned within the stick bore that a dome-shaped end thereof points to the stick end.

* * * * *